Figures 1, 2:
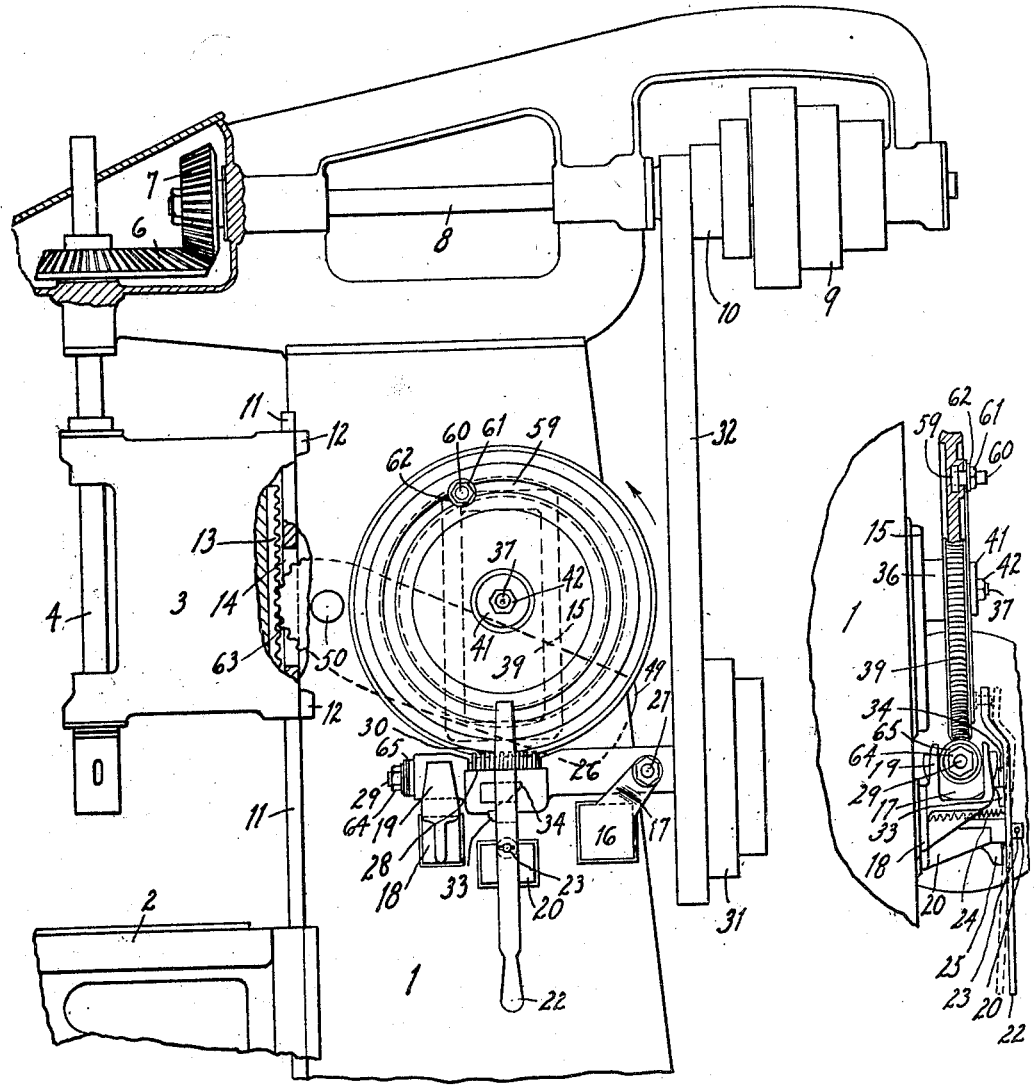

Feb. 12, 1924.  
G. V. CURTIS ET AL  
VARIABLE FEED MECHANISM  
Filed Nov. 14, 1922

1,483,719

George V. Curtis, William H. Munier, INVENTORS.

BY Frank A. Cutter, ATTORNEY.

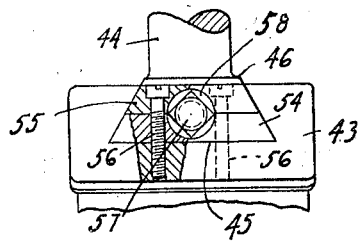
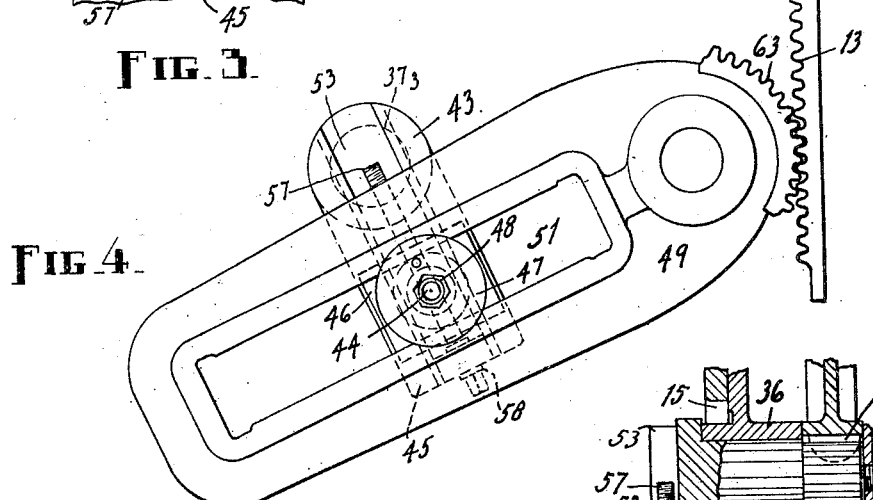
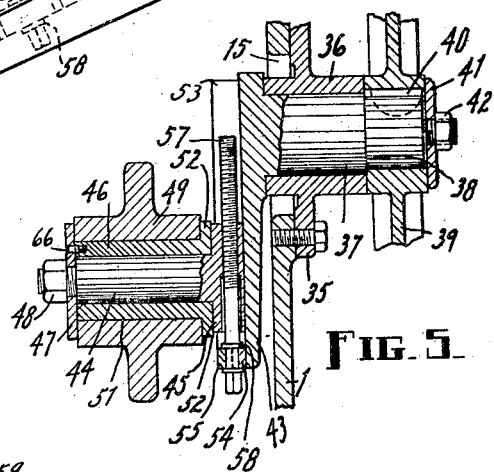
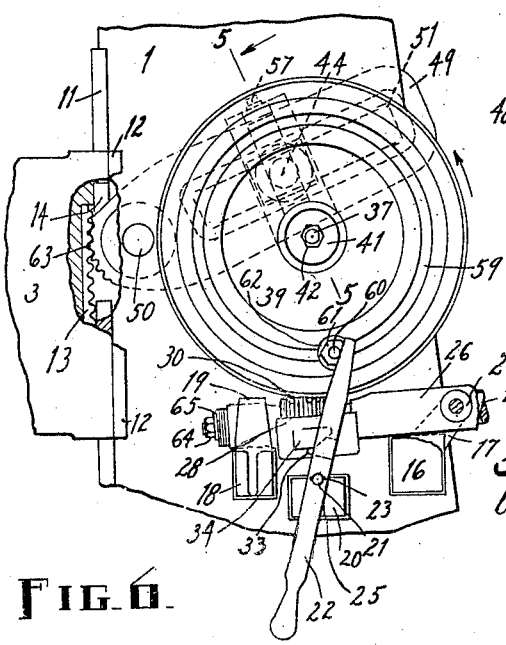

Patented Feb. 12, 1924.

1,483,719

UNITED STATES PATENT OFFICE.

GEORGE V. CURTIS, OF WEST SPRINGFIELD, AND WILLIAM H. MINER, OF SPRINGFIELD, MASSACHUSETTS; SAID MINER ASSIGNOR TO SAID CURTIS.

VARIABLE-FEED MECHANISM.

Application filed November 14, 1922. Serial No. 600,873.

*To all whom it may concern:*

Be it known that we, GEORGE V. CURTIS, a resident of West Springfield, in the county of Hampden and State of Massachusetts, and WILLIAM H. MINER, a resident of Springfield, in said county and State, both citizens of the United States of America, have jointly invented a new and useful Variable-Feed Mechanism, of which the following is a specification.

Our invention relates to improvements in feed mechanism which is more especially adapted for single-spindle and multiple spindle drill-presses, although capable of being applied to broaching machines and other machines which drive various kinds of cutting implements or tools and the like, and resides essentially in a construction wherein a crank operates through a lever to obtain the feed motion, and in certain adjustment and knock-off or trip elements, all as hereinafter set forth.

The primary object of our invention is to provide feed mechanism for the cutting-implement or tool head or holding and carrying device, of a drill-press or other machine, whereby the cutting movement of the head is slow, and the return movement of said head is quick, and the speed of said cutting movement is varied so that the tool is moved longitudinally at the minimum rate of speed at each end of its longitudinal travel, hence breaks through the work at such rate of speed. The mechanism can be set so as to cause the tool to commence operation approximately as soon as the head begins to make its active stroke, when the travel is at the minimum rate of speed, on the one hand, or after said head has made a part of said stroke, when said travel is at the maximum rate of speed or approximately so, on the other hand. Moreover, the mechanism can be set in such a manner as to increase the reciprocating movement of the head at each cycle of said mechanism, or to decrease such movement, as may be desired or necessary in order to meet different conditions or requirements, the kind of work to be done and the character of the stock to be cut or drilled being the determining factors in this and also in the other case.

Another object is to produce mechanism of this character which is comparatively simple in construction and operation, and includes highly practicable and efficient means for starting, stopping, and controlling the parts and members which are most directly or immediately concerned in operating or actuating the tool head or other reciprocating elements.

A further object is to provide variable feed mechanism that can be most advantageously applied to drill presses, wherein it is of the utmost importance to be able to vary and control the feed of the slide or head which carries the drill or drills, such head operating or being operated in a fixed plane that is vertical.

Still another object is to provide the mechanism with means of adjustment adequate to the wide and diversified range needed.

Other objects and advantages will appear in the course of the following description.

We attain the objects and secure the advantages of our invention by the mechanism illustrated in the accompanying drawings, in which—

Figure 1 is a side elevation of variable feed mechanism which embodies a practical form of our invention, showing the same applied to a single-spindle drill-press, only so much of said drill-press being shown as is needed for a clear understanding of the invention, and parts of the same being broken away for the purpose of exposing parts that otherwise would be hidden; Fig. 2, a front elevation of said mechanism, a portion of the worm-wheel being in section; Fig. 3, an enlarged end elevation, in partial section, of the adjusting device for the sliding block; Fig. 4, an enlarged, inner-side elevation of the feed lever and parts and members carried thereby; Fig. 5, an enlarged cross section through the mechanism, exclusive of the driving and knock-off or trip elements, taken on lines 5—5, looking in the direction of the associated arrow, in Fig. 6, and, Fig. 6, a side elevation of the mechanism showing the parts differently disposed relative to their positions in the first view.

Similar reference characters designate similar parts throughout the several views.

Before taking up our invention in detail, we will briefly describe the parts and members of the single-spindle drill-press in connection with which said invention is illustrated.

A column 1 is equipped with a work table 2, and a vertically reciprocating head 3 for a tool or drill spindle 4, all of usual and well-known construction. The spindle 4 is driven, as is the custom, by means of a bevel-gear 6 through which said spindle extends, and a bevel-gear 7 secured to a horizontal shaft 8 and intermeshing with said first-named bevel-gear. The shaft 8 is journaled in the usual bearings provided for that purpose on top of the column 1, and is driven by a belt (not shown) applied to a cone-pulley 9 secured to said shaft. There is also a cone-pulley 10 secured to the shaft 8. The column 1 has on each side a guide flange 11 for the head 3, and the latter is provided with a gib 12 on each side to engage the contiguous flange. The head 3, in this case, is further provided, adjacent to the column 1, with a vertical rack 13. There is a vertical slot 14 in the column 1 directly behind the rack 13, and a flanged opening 15 in one side of said column.

The cone-pulley 10 and the rack 13 are in reality elements belonging to the new mechanism, which mechanism will now be described.

On the same side of the column 1 in which the opening 15 is located, is a bracket 16 having an upwardly- and rearwardly-extending bearing 17, a bracket 18 in front of said first-named bracket, said second-named bracket having an outwardly-projecting, U-shaped stirrup 19, and a bracket 20 intermediate of the other two brackets. At the outer end of the bracket 20 is a stud 21 on which is loosely mounted an approximately vertical, shift or trip lever 22, a pin 23 being inserted in said stud and projecting beyond the same outside of said lever to prevent the latter from coming off of the stud. The connection between the lever 22 and the stud 21 is sufficiently loose to enable said lever not only to be rocked or swung in a vertical plane at right-angles to the axis of the stud 21, but also to be rocked or swung in a plane at right-angles to said first-named plane. A spring 24, Fig. 2, may be arranged between the inside of the lever 22 and an adjacent point on the column 1 for the purpose of normally retaining said lever in an approximately vertical position, with the hub of the lever flat against the contiguous part of the bracket 20, or of assisting in so doing. A depending stop 25 at the outer end of the bracket 20, which stop is set back a little from the extreme portion of such end, receives the lever 22 below the stud 21, when said lever is rocked on said stud in a plane with which the axis of said stud coincides throughout, in order positively to limit the outward movement in such plane of said lever above said stud.

An approximately horizontal housing 26 has its rear terminal portion pivotally connected with the bearing arm 17 by means of a horizontal pivot 27. The housing 26 extends forwardly to and through the stirrup 19, and has an opening 28 in the top and behind said stirrup. A shaft 29 is journaled in the housing 26, and a worm 30 is secured on said shaft in position to extend through the opening 29. Secured on the rear terminal of the shaft 29 is a cone-pulley 31. A belt 32 connects the cone-pulley 31 with the cone-pulley 10. Thus it will be seen that the shaft 29 is driven from the shaft 8 through the medium of the cone-pulley 10, the belt 32, and the cone-pulley 31.

A lower cam-block 33 is secured to the inner face of the trip lever 22 above the stud 21, and a cooperating and contacting, upper cam-block 34 is secured on the outer side of the housing 26. It is the contiguous edges of the cam-blocks 33 and 34 that are in contact, and such edges are of sufficient thickness to prevent the cam-block 33 from being carried out of engagement with the cam-block 34, when the lever 22 is rocked or tilted on the stud 21 to carry the upper end of said lever outwardly, as indicated by dotted lines in Fig. 2. The lever 22 and the cam-blocks 33 and 34 are all adjacent to the worm 30. The construction and arrangement of these parts and members are such that, when the lever 22 is standing approximately vertically, as in Figs. 1 and 2, the cam-block 33 is so disposed beneath the cam-block 34 as to cause the housing 26 and the shaft 29 to be supported on the pivot 27 in an approximately horizontal position, with the forward terminal portion of said housing above the bottom of the stirrup 19; when said lever is swung on the stud 21 in such a manner as to carry the cam-block 33 rearwardly, the block 34 descends, consequently said housing swings downwardly forward of said pivot until the housing comes to rest in said stirrup, the housing and said shaft now being inclined—see Fig. 6; and, when said lever is swung back into an approximately vertical position, the cam-block 33 forces the cam-block 34 upwardly, and thus causes the inclined parts and members to be restored to their former approximately horizontal position. To these ends the contiguous edges of the cam-blocks incline from the rear downwardly and forwardly. The worm 30 is, of course, carried up and down with the shaft 29 and the housing 26. The lever 22 is automatically actuated to permit the parts forward of the pivot 27 to swing downwardly on said pivot, and actuated by hand to cause said parts to be swung upwardly again on said pivot, by the means and in the manner hereinafter explained, the movement of the housing 26 on the pivot 27, and consequently the corresponding movement of the shaft 39, and especially of that portion of said shaft on which the cone-pulley 31 is located, is comparatively slight, and in any event not sufficient to interfere with the maintenance of a proper belt connection between said cone-pulley and the cone-pulley 10.

Bolted or otherwise secured to the outside of the column 1, over the flanged opening 15, is a plate 35 which is provided with a bearing 36 that extends outwardly from said plate and also inwardly through said opening. Journaled in the bearing 36 is a short crank-shaft 37. The crank-shaft 37 extends outwardly beyond the bearing 36, and is shouldered, as represented at 38 in Fig. 5, and a worm-wheel 39 is mounted on said crank-shaft at the right of the shoulder. The worm-wheel 39 is keyed at 40 to the crank-shaft 37. The hub of the worm-wheel 39 is held on the crank-shaft, against movement longitudinally of the axis of said hub, by the shoulder 38 and a washer 41 and nut 42, said nut being screwed onto a threaded projection or extension from the outer end of said crank-shaft, and said washer being interposed between said hub and said nut. At the inner end of the crank-shaft is a crank arm 43, which arm has a hubbed portion that extends over the inner edge of the bearing 36. The crank arm 43 is provided with a crank pin 44, such pin being integral with a slide 45 that is arranged and adapted to be longitudinally adjusted in the crank arm 43. A block 46 is loosely mounted on the crank pin 44, and held in place thereon by the slide 45 on one side and a washer 47 and nut 48 on the other side. The nut 48 is screwed onto a threaded projection or extension from the pin 44, outside of the washer 47. The washer 47 may also, for obvious reasons be pinned, as at 66, to the block 46. A feed lever 49, for the head 3, is pivotally mounted at 50, adjacent to the forward end of said lever, to the column 1. In this example the lever 49 has at the forward terminal a segmental-gear 63 that intermeshes with the rack 13. There is a longitudinal slot 51 in the lever 49, behind the pivot 50, to receive the block 46 which is adapted to slide in said slot. The block 46 is provided with upper and under flanges 52 which are located between the adjusting slide 43 and the adjacent side of the lever 49, engaging said lever at points adjacent to the longitudinal edges of the slot 51 therein. On the other side of the lever 49 is the washer 47, the diameter of which is sufficient to enable said washer to engage said lever on both sides of the slot 51, or to overlay the longitudinal edges of such slot. The block, with the flanges 52 and washer 47, and the feed lever are free to move relatively within the limits fixed by the ends of the slot 51.

Referring to Figs. 3 and 5, it will be seen that the crank arm 43 has in the inner face thereof a central, longitudinal groove 52 which has undercut sides to receive the adjusting slide 45, the latter being shaped to fit such groove. Blocks 54 and 55, the latter outside of the former, are fitted to the groove 53 at the outer end thereof, and are secured in said groove by means of a pair of screws 56—56 which pass through said blocks into threaded engagement with the arm 43, the heads of said screws being countersunk in the exposed edge of the block 55—see Fig. 3. An adjusting screw 57 is received in suitable semi-circular openings in the centers of the contiguous edges of the blocks 54 and 55, and is in threaded engagement with the slide 45. The screw 56 is held against endwise movement by means of collars 58 on said screw, one each side of the blocks 54 and 55. Upon rotating the screw 57 in one direction, said screw actuates the slide 55 toward the axial line of the crank-shaft 37, and, upon rotating said screw in the opposite direction, the screw actuates said slide away from said line. By this means the throw of the crank pin 44 is increased or decreased, accordingly as the slide 45 be actuated toward the axial line of the crank-shaft or away from such line.

There is a T-slot 59 in the face of the worm-wheel 39, and a trip pin 60 has a T-head which is receivable in said T-slot, as shown in Fig. 2. The pin 60 may be adjusted at any point in the circumference of the T-slot 59, and after adjustment is secured in place by means of a nut 61 and a washer 62 with which said pin is provided, as is customary in devices of this character. The upper terminal of the trip lever 22 is in the path of the pin 60.

The worm-wheel 39 is rotated by the worm 30 in the direction indicated by the arrows in Figs. 1 and 6, and when the trip pin 60 is carried, by the rotating worm-wheel, into contact with the upper terminal of the trip lever 22, said terminal with the cam-block 33 is actuated rearwardly, with the result that the parts and members, which are in front of the pivot 27, and supported by said block, swing downwardly on said pivot, and thus disengage the worm 30 from said worm-wheel. Immediately the worm-wheel comes to a stop. In order to start the worm-wheel again, it is necessary to grasp the lower end or handle of the lever 22 and first swing the top of said lever outwardly, against the resiliency of the spring 24, far enough to clear the pin 60, then swing such top forwardly past said pin, and finally swing such top inwardly again on the other or front side of the pin, said spring assisting in this last operation, and in retaining said lever in the position it now occupies, as previously observed. When the lever 22 is actuated to carry the top thereof forwardly, the cam-block 33 forces upwardly the cam-block 34, and thus causes the worm 30 to reengage the worm-wheel 39. The worm-wheel immediately commences to revolve and continues until it has made one complete revolution and again caused the trip members to be operated and the worm to become disengaged from said worm-wheel once more.

Obviously, the feed lever 49 is oscillated on its pivot 50 at each revolution of the worm-wheel 39, through the medium of the crank-shaft 37, crank arm 43, crank pin 44, and block 46; and such oscillation, relative to the starting and stopping of the worm-wheel, is dependent on the position of the trip pin 60 in or on said worm-wheel. If the pin 60 be so set that it contacts with the trip lever 22 at the time the lever 49 is actuated by the crank into the extreme upward limit of the arcuate path of said lever, the rack 13 is actuated downwardly into its lowest position by the segmental-gear 63 on said lever, that is to say, the lowest position commensurate with the throw of the crank pin 44, which latter, it will be remembered, can be adjusted to vary such throw. And the segmental-gear 63, when the lever 49 is swung to the opposite extreme limit of its arcuate path, by the crank as the same continues to rotate, and as the pin 60 approaches and passes the point in its circuit that is diametrically opposite to that where said pin encountered and tripped the lever 22, actuates the rack 13 into its highest position. To be more exact, with the trip pin set as illustrated in connection herewith, the down or feed motion of the head takes place while the crank is making about 230 degrees (two-thirds) of its revolution, and the up or return stroke of said head takes place while said crank is making about 130 degrees (one-third) of said revolution. Thus the quick return (in approximately one-third of the revolution of the crank), even though the feed lever moves more slowly during this third of the revolution than it does during parts of the other two-thirds of the revolution. At each cycle of the worm-wheel, therefore, when the parts and members are set and disposed as illustrated and explained, the lever 49 elevates the head 3 at a fair rate of speed while said worm-wheel is making approximately one-third of a revolution, the same being the last third, and said head is actuated downwardly at a slower and varying speed while said worm-wheel is making the first two-thirds of said revolution, the speed of said head downwardly starting at a slow rate and increasing, as the block 46 moves rearwardly in the slot 51, until the worm-wheel has completed approximately the first third of its revolution, and then commencing to decrease and continuing to decrease, as said block moves forwardly in said slot, while said worm-wheel is making the second third of its revolution. The maximum speed of the head is intermediate of the ends of its down stroke, and the minimum rate of speed is at the begining and end of such stroke.

By changing the position of the trip pin 60, any desired relative variation in the downward travel of the head 3 can be obtained. For example, if the pin 60 be moved to the right of its position in Fig. 1, and secured by means of the nut 61 and the washer 62 in the new position, said pin will trip the lever 22 later, than in the first instance, and thus cause the worm-wheel 39 to be stopped after, instead of at the time, the lever 49 reaches the upper confines of the arcuate path thereof. Consequently, at the next revolution of said worm-wheel, the head 3 is first elevated through the remaining portion of its upward travel, or while the block 46 moves from the front end back toward the rear end of the slot 51, as the crank revolves; then said head is caused to descend, with increasing speed, while said block moves back to said rear end of said slot, and with decreasing speed, while the block moves forward to the point where the direction of the lever 49 is changed; and finally said head is caused to ascend until the trip mechanism operates to stop the parts and members controlled thereby, the slide meanwhile having moved to the vicinity of the front end of the slot. It will now be clearly seen that a great many changes, in the starting and stopping actions or timing of the head 3, can be made.

In Fig. 6 the head 3 is in its highest position ready to descend when the worm-gear is set in motion, while in Fig. 1 said head is descending and will presently arrive at the end of its down stroke or travel.

The crank-shaft 37 and the pivot 50 are in the same horizontal plane.

Although the operation of the mechanism as a whole will be quite well understood from the foregoing, the same is briefly described as follows:

The trip lever 22 is grasped and manipulated to transfer the head thereof from the back to the front side of the trip pin 10, thus causing the worm 30 to engage the worm-wheel 39 and set the latter in motion, and at the same time resetting said lever in position to be tripped by said pin at the end of the complete revolution of said worm-wheel. The crank, which is revolved by the worm-wheel, swings the feed lever 49 upwardly through its arcuate path, first at a speed which increases and then at a speed which decreases, until said lever arrives at the top of said path. During this time the feed lever moves the head 3 down from the high to the low position of said head, and at a varying speed commensurate with the varying speed of said lever. The crank, continuing uninterruptedly its revolution, then swings the feed lever downwardly through its arcuate path until said lever arrives at the bottom of said path. During this time the feed lever moves the head 3 up from the low to the high position of said head. The travel of the crank pin 44 being so much less, or the path thereof being so much shorter, while said pin is causing the feed lever to elevate the head, than while said pin is causing said lever to depress said head, the raising of the latter is accomplished in considerably less time than is the depression of the same, even though the maximum portion of the varying speed of the lever is attained during the upward swing thereof. By the time the head arrives at the high point, the trip mechanism is operated to stop the worm-wheel and the parts and members actuated thereby.

The drill press equipped with this mechanism operates in practically the same manner as the drill press having an old type of feed, except that the head of the drill-press equipped with said mechanism feeds the drill (no shown) through the work at a speed which is slow at the start and finish, but increases during the first half of the descent and diminishes during the last half of the descent of the drill, or such speed may be at the maximum at the beginning of the cutting operation and decrease to the minimum when and where the drill breaks through the work, according to the location of the trip pin on the worm-wheel relative to the crank pin, all of which has been hereinbefore made plain, as, also, has the fact that many other changes in the feed are possible. The trip pin must be moved approximately one-sixth of the circumference of the T-slot 59 to the right of the position of said pin in Fig. 1, in order to obtain the maximum feed of the drill at the beginning of the cutting operation.

The shaft 29 is held against endwise movement by the cone-pulley 31 on said shaft at the rear end of the housing 26, and washers 64 and a nut 65 on said shaft at the front end of said housing.

It is not, of course, necessary that the shaft 29 be driven from the shaft 8, or that said first-named shaft be driven by a belt at all. Furthermore, while a toothed connection between the head 3 and the feed lever 49 is believed to be best from a mechanical standpoint, it is quite possible that some other well-known means of connection between these elements might be substituted for the toothed connection.

More or less change in the shape, size, construction, and arrangement of some or all of the parts of this mechanism, in addition to those hereinbefore specifically pointed out, may be made, without departing from the spirit of our invention or exceeding the scope of what is claimed.

What we claim as our invention, and desire to secure by Letters Patent, is—

1. A feed mechanism for drill spindles comprising a member adapted to be reciprocated, a pivotally-mounted slotted lever operatively connected with said member, a suitably journaled crank-shaft having an arm, a slide adjustably connected with said arm, said slide being provided with a pin, a block mounted on said pin and adapted to slide in the slot in said lever, and revoluble means for said crank-shaft.

2. A feed mechanism for drill spindles comprising a member adapted to be reciprocated, a pivotally-mounted slotted lever operatively connected with said member, a suitably journaled crank-shaft having a grooved arm, a slide in the groove in said arm, said slide being provided with a pin, an adjusting screw in engagement with said slide, means to hold said screw against endwise movement relative to said arm, a block mounted on said pin and adapted to slide in the slot in said lever, and revoluble means for said crank-shaft.

3. The combination, in variable feed mechanism, with a member adapted to be reciprocated, of a pivotally-mounted lever operatively connected with said member, a suitably journaled crank operatively connected with said lever, the latter being pivotally mounted at a point intermediate of the connection between said member and lever and the connection between the lever and said crank, and a driving member for said crank provided with a trip pin, of a driving member for said first-named driving member, said second-named driving member being adapted to be engaged with and disengaged from said first-named driving member, an oscillatory trip lever directly in the path of said pin, and means to cause said second-named driving member to be disengaged from said first-named driving member when said lever is actuated by said pin.

4. The combination, in variable feed mechanism, with a member adapted to be reciprocated, an oscillatory lever operatively connected with said member, a suitably journaled crank operatively connected with said lever, the latter being pivotally mounted at a point intermediate of the connection between said member and lever and the connection between the lever and said crank, and a revoluble member mounted on the crank-shaft and provided with a trip pin, of a pivotally-mounted housing provided with a cam-block, a shaft journaled in said housing, a driving member on said shaft for said revoluble member, and a pivotally-mounted trip lever provided with a cam-block in position to elevate said first-named cam-block and rock said housing upwardly to carry said driving member into engagement with said revoluble member, when said trip lever is swung in one direction, and retain the parts in raised position, and to lower said first named cam-block and permit said housing to rock downwardly, thus carrying said driving member out of such engagement, when said trip lever is swung in the opposite direction, the trip lever being in the path of said pin.

5. The combination, in variable feed mechanism, with a bracket, a housing pivotally connected with said bracket and provided with a cam-block, a stirrup for said housing, a shaft journaled in said housing and provided with a driving member, and a trip lever mounted for operation in planes which are in angular relationship, said lever being provided with a cam-block to cooperate with said first-named cam-block for the purpose of swinging said housing out of engagement with the bottom of said stirrup, and permitting the same to return to rest on such bottom, of a suitably journaled crank, a revoluble member mounted on the crank-shaft, and provided with a trip pin for said lever, but of which pin the lever may be swung clear, a pivotally-mounted lever operatively connected with said crank, and a member adapted to be reciprocated and with which said last-named lever is operatively connected.

6. The combination, in variable feed mechanism, with a pivotally-mounted housing provided with a cam-block, a shaft journaled in said housing and provided with a driving member, and a trip lever mounted to operate in planes which are in angular relation to each other, and provided with a cam-block to cooperate with said first-named cam-block, the construction and arrangement of parts being such that said cam-blocks are always in engaging relationship, of a suitably journaled crank, a revoluble member mounted on the crank-shaft, and provided with a trip pin for said lever, but of which pin the lever may be swung clear, said revoluble member being adapted to be driven by said driving member, a pivotally-mounted lever operatively connected with said crank, and a member adapted to be reciprocated, which member is operatively connected with said last-named lever.

7. The combination, in variable feed mechanism, with a pivotally-mounted housing provided with a cam-block, a shaft journaled in said housing and provided with a driving member, a trip lever mounted to operate in planes which are in angular relation to each other, having a handle at the lower terminal, and provided with a cam-block to cooperate with said first-named cam-block, the construction and arrangement of parts being such that said cam-blocks are always in engaging relationship, and means to limit the outward swing of said lever above the pivotal support therefor, of a suitably journaled crank, a revoluble member mounted on the crank-shaft, and provided with a trip pin for said lever, a pivotally-mounted lever operatively connected with said crank, and a member adapted to be reciprocated and with which said last-named lever is operatively connected.

GEORGE V. CURTIS.
WILLIAM H. MINER.

Witnesses:
F. A. Cutter,
C. C. West.